United States Patent [19]

Studer

[11] 3,734,584
[45] May 22, 1973

[54] ROLLER BEARING

[75] Inventor: Robert Martin Studer, Bristol BS9 4LH, England

[73] Assignee: The Secretary of State for Defence in Her Majesty's Britannic Government of the United Kingdom of Great Britain and Northern Ireland, London, England

[22] Filed: May 17, 1971

[21] Appl. No.: 144,205

[52] U.S. Cl. ................................. 308/213
[51] Int. Cl. ............................. F16c 33/00
[58] Field of Search ................. 308/214, 215

[56] References Cited

UNITED STATES PATENTS

| 675,617 | 6/1901 | Bartholomew | 308/211 |
| 3,281,191 | 10/1966 | Benson | 308/215 |

*Primary Examiner*—Charles J. Myhre
*Assistant Examiner*—Frank Susko
*Attorney*—Stevens, Davis, Miller & Mosher

[57] ABSTRACT

The disclosure of this invention pertains to a roller bearing in which the rolling element has the form of alternately orientated frusto-cones and the races have corresponding frusto-conical tracks.

3 Claims, 4 Drawing Figures

ROLLER BEARING

This invention relates to roller bearings.

The object of the invention is generally to provide a roller bearing having improved axial load capacity in addition to good radial load capacity.

It is also an object of the invention to provide a roller bearing having radial and axial load capacity whose radial size is significantly less than a ball bearing of similar radial and axial load capacity.

It is also an object of the invention to provide a roller bearing having both radial and axial load capacity and having a substantially lesser weight of the rolling element, and consequently lesser centrifugal load on account of the orbital movement of the rolling element at high speeds.

According to the invention there is provided a roller bearing comprising rollers each shaped to define at least four co-axial alternately orientated frusto-conical surfaces, and races between which the roller are supported and which are shaped to define frusto-conical surfaces corresponding to those of the rollers.

The frusto-conical surfaces are capable of carrying both radial and axial forces. The distribution of these forces on a plurality of axially sequential frusto-cones leads to a diminution in the radial dimensions and in the weight of the rolling elements with consequent benefit as regards radial dimensions of the bearing as a whole and diminution of centrifugal force.

The angle between adjacent conical surfaces determines the relationship between the radial and axial load capacities, i.e. the smaller that angle the greater the axial and the less the radial capacity, for a given overall length of roller.

It is desirable that the bearing forces acting normally to the frusto-conical surfaces should not be such as to tend to tilt the roller, i.e. impart a turning couple thereto. Any such tilting forces are related to said angle and the roller diameter in the sense that the smaller the angle the greater the roller diameter will have to be to satisfy a condition of zero forces, but unduly large diameters would of course conflict with the requirement for low radial dimensions and centrifugal force.

It has been found that an angle in the range of 115°–125° offers the best compromise.

Examples of a bearing according to this invention will now be described with reference to the accompanying drawings wherein.

Figure 1:
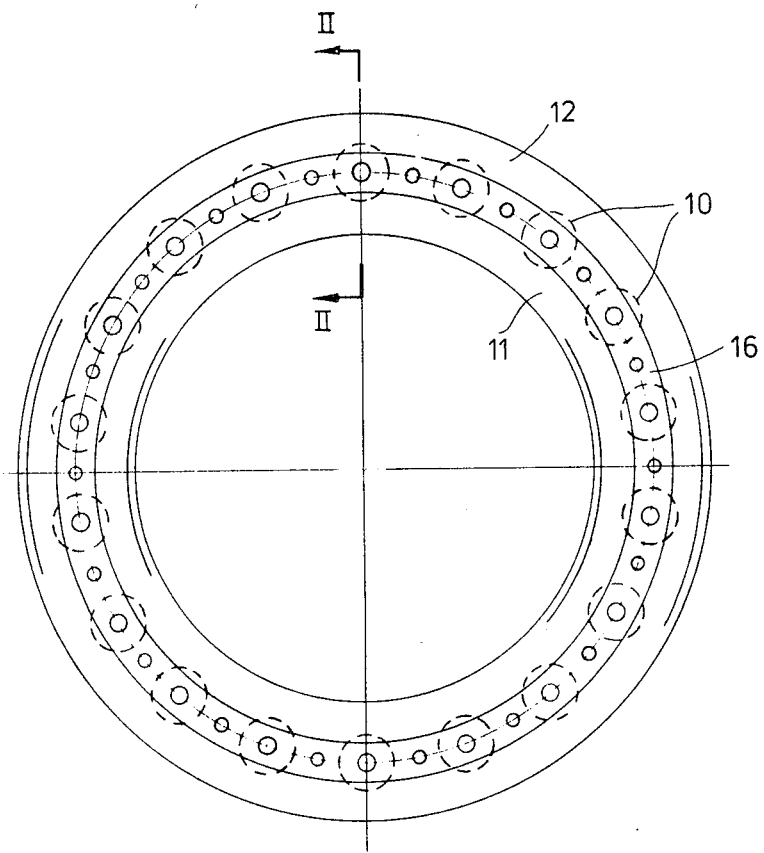
FIG. 1 is an axial end view of the bearing
Figure 2:
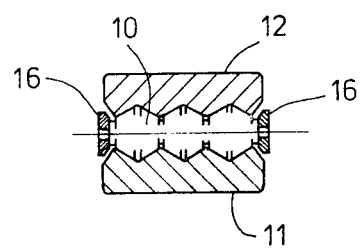
FIG. 2 is a section on the line II—II in FIG. 1.
Figure 3:
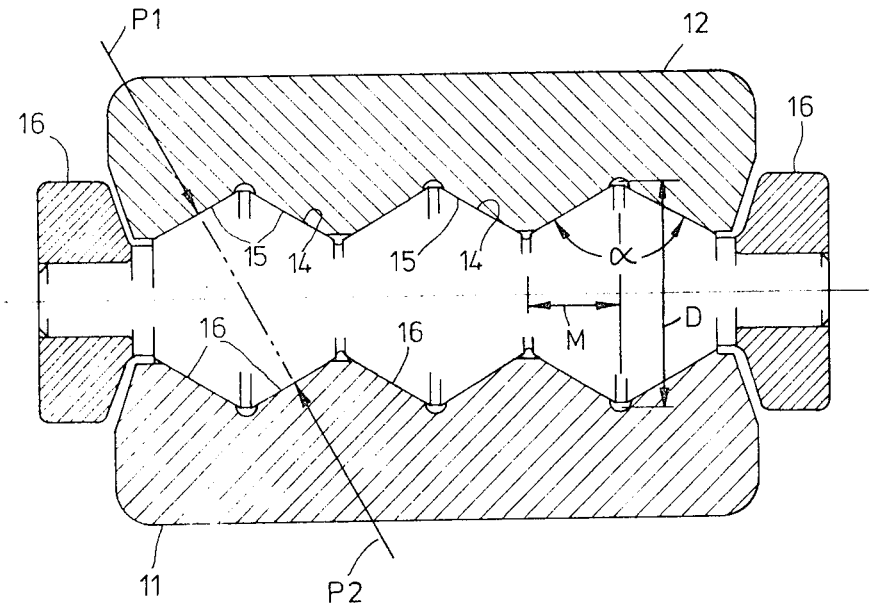
FIG. 3 is an enlarged view of FIG. 2.

Referring to FIGS. 1 to 3, the bearing comprises rollers 10 supported between an inner race 11 and an outer race 12 and spaced at equal intervals by means of cage 16. The periphery of each roller is formed to define co-axial frusto-conical surfaces 14 orientated alternately i.e. forming pairs of oppositely facing frusto-cones. The races 11, 12 are correspondingly formed to have frusto-conical surfaces 15, 16 engaging the frusto-conical surfaces 14.

The angle $\alpha$ between adjacent conical surfaces is in the range of 115° to 125°, and in this example a value of 120° has been selected as this provides a good combination of high radial and high axial load carrying capacity.

The force acting on the surface 15 normally thereto has a resultant P1 (FIG. 3), and there is a corresponding opposing resultant P2 acting on the surface 16 of the adjacent frusto-cone. To ensure that there is no turning couple on the roller the diameter thereof is so chosen that the forces P1, P2 lie on the same straight line as shown. For an angle $\alpha = 120°$, the above condition is satisfied if the theoretical apex diameter D of the roller at the large ends of the frusto-cones is approximately 2.3 times the full axial extent M of the frusto-cones.

Calculations show that, for equal surface stress, the bearing according to this invention will accept considerably larger axial and radial loads than an angular contact or a split race ball bearing of the same width and pitch circle diameter. The advantage becomes greater as the speed of rotation of the bearing increases; this is because the small diameter of the rollers generates smaller additional centrifugal loads than the comparable balls of a conventional bearing.

Figure 4:
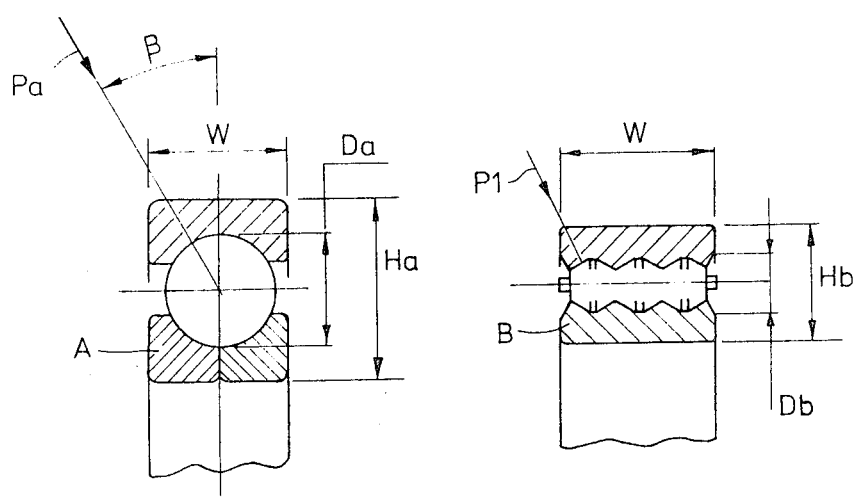
FIG. 4 is a size comparison between a conventional ball bearing and a comparable bearing according to the invention.

FIG. 4 illustrates the above comparison on the basis of a pitch circle diameter of 5 inch and width W of 1.125 inch. The conventional bearing A is of the "Aero" split inner race type and has a radial thickness Ha = 1.25 inch. The bearing according to the invention, denoted B, has a radial thickness H = 0.8 inch. Both bearings are drawn to the same scale and the size relation between the rolling elements of the two bearings will be noted. The diameter $Db$ of the roller in bearing B is 0.38 inch while the ball diameter $Da$ in bearing B is 0.75 inch. The contact angle B of bearing B is 35°.

The following table shows further details of the comparison between the bearings A,B. The figures have been computed, using conventional formulas, for a rotational speed of the inner race of 20,000 RPM and for a maximum Hertzian surface stress of 250,000 b/in².

|  | Bearing A | Bearing B |
|---|---|---|
| Number of rolling elements | 18 | 22 |
| Centrifugal Load for rolling element | 400 lb | 128 lb |
| Normal Load (Pa, P1, respectively) per rolling element | 503 lb | 1020 lb |
| Total axial load of bearing | 4680 lb | 11200 lb |
| Total radial load of bearing | 2100 lb | 7800 lb |
| Maximum sliding speed under axial load only | 2385 ft/min | 4000 ft/min |
| under radial load only | 3800 ft/min | 4000 ft/min |

It will be seen that the axial load capacity of bearing B is 2.4 times greater than that of bearing A while the radial load capacity is 3.7 times greater. The sliding speed under axial load only is appreciably higher in bearing B but experience shows that this is within an acceptable range.

For assembly of the rollers in position, the inner race is placed in position within the outer race but eccentrically thereto, and as many rollers as possible are fed into the crescent-shaped space between the eccentrically placed races.

To maintain the rollers within equal distance of each other, a split cage is provided, the two halves of the cage being riveted together after the rollers have been inserted.

We claim:

1. A roller bearing comprising rollers each shaped to define at least four co-axial alternately orientated frusto-conical surfaces, and races between which the rollers are supported and which are shaped to define frusto-conical surfaces corresponding to those of the rollers, the diameter of the roller and the angle between adjacent conical surfaces being so related that the resultant of the forces acting normally on a said frusto-conical surface of one of the races is in line with the resultant of forces acting normally on an adjacent frusto-conical surface of the other race.

2. A roller bearing according to claim 1, wherein the angle between adjacent conical surfaces is in the range of 115° to 125°.

3. A roller bearing according to claim 1 wherein the angle between adjacent conical surfaces is approximately 120° and the diameter of said roller at the large ends of the frusto-cones formed by said frusto-conical surfaces is approximately 2.3 times the full axial extent of said frusto-cones.

* * * * *